US007146639B2

(12) United States Patent
Bartal et al.

(10) Patent No.: US 7,146,639 B2
(45) Date of Patent: Dec. 5, 2006

(54) METHOD AND APPARATUS FOR MANAGING A FIREWALL

(75) Inventors: Yair Bartal, New York, NY (US); Alain Jules Mayer, New York, NY (US); Avishai Wool, Livingston, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 139 days.

(21) Appl. No.: 10/336,874

(22) Filed: Jan. 6, 2003

(65) Prior Publication Data

US 2003/0120955 A1    Jun. 26, 2003

Related U.S. Application Data

(63) Continuation of application No. 09/240,934, filed on Jan. 29, 1999, now abandoned.

(51) Int. Cl.
*G06F 9/00* (2006.01)

(52) U.S. Cl. .............................. 726/11; 709/225; 726/3; 726/6

(58) Field of Classification Search ................. 713/201, 713/150–154; 709/225, 246–247, 249; 726/11, 726/3, 6; 370/389
See application file for complete search history.

(56) References Cited

U.S. PATENT DOCUMENTS 5,826,014 A   10/1998   Coley et al.

(Continued)

FOREIGN PATENT DOCUMENTS

EP         0 658 837         6/1995

(Continued)

OTHER PUBLICATIONS

Grennan, Mark, "Firewalling and Proxy Server HOWTO", Nov. 1996, wysiwyg://51/http://secinf.net/info/fw/howto/Firewall-HOWTO.html, Version 0.4.

(Continued)

*Primary Examiner*—Hosuk Song
*Assistant Examiner*—Thomas Gyorfi

(57) ABSTRACT

A method and apparatus are disclosed for managing a firewall. The disclosed firewall manager facilitates the generation of a security policy for a particular network environment, and automatically generates the firewall-specific configuration files from the security policy simultaneously for multiple gateways. The security policy is separated from the vendor-specific rule syntax and semantics and from the actual network topology. Thus, the security administrator can focus on designing an appropriate policy without worrying about firewall rule complexity, rule ordering, and other low-level configuration issues. In addition, the administrator can maintain a consistent policy in the presence of intranet topology changes. The disclosed firewall manager utilizes a model definition language (MDL) and an associated parser to produce an entity relationship model. A model compiler translates the entity-relationship model into the appropriate firewall configuration files. The entity-relationship model provides a framework for representing both the firewall-independent security policy, and the network topology. The security policy is expressed in terms of "roles," which are used to define network capabilities of sending and receiving services. A role may be assumed by different hosts or host-groups in the network. A visualization and debugging tool is provided to transform the firewall-specific configuration files into a graphical representation of the current policy on the actual topology, allowing the viability of a chosen policy to be evaluated. A role-group may be closed to prevent the inheritance of roles.

16 Claims, 8 Drawing Sheets

U.S. PATENT DOCUMENTS

| | | |
|---|---|---|
| 5,835,726 A | 11/1998 | Shwed et al. |
| 5,913,024 A | 6/1999 | Green et al. |
| 5,918,018 A | 6/1999 | Gooderum et al. |
| 5,968,176 A | 10/1999 | Nessett et al. |
| 6,154,775 A | 11/2000 | Coss et al. |
| 6,175,917 B1 | 1/2001 | Arrow et al. |
| 6,182,226 B1 | 1/2001 | Reid et al. |
| 6,212,558 B1 | 4/2001 | Antur et al. |
| 6,219,707 B1 | 4/2001 | Gooderum et al. |
| 6,327,618 B1 | 12/2001 | Ahlstrom et al. |
| 6,332,195 B1 | 12/2001 | Green et al. |
| 6,484,261 B1 * | 11/2002 | Wiegel ................. 713/201 |
| 6,539,021 B1 * | 3/2003 | Kennelly et al. ......... 370/401 |

FOREIGN PATENT DOCUMENTS

| | | |
|---|---|---|
| JP | 02001237895 A | 8/2001 |
| WO | WO 9854644 | 11/1998 |

OTHER PUBLICATIONS

Bartal et al, "Firmato: A Novel Firewall Management Toolkit," May 1999, Security and Privacy, 1999. Proceedings of the 1999 IEEE Symposium.

J.D. Guttman, Filtering Postures: Local Enforcement for Global Policies, Proc 1999 IEEE Symp. on Security and Privacy (1997).

* cited by examiner for each role r in the role-group assigned to $H_1$:

for each statement in the form: { r $ R : s}

/* where r is a role, $ indicates the direction, R is a role-group and s is a service */ if $H_2$ is closed: /* create a rule if $H_2$ has a role, r */ if the role-group assigned to $H_2$ contains a role in R, then, create a positive rule between $H_1$ and $H_2$ with service = s otherwise, for all host-groups G that contain $H_2$:

if the role-group assigned to G contains a role in R create positive rule between $H_1$ and $H_2$ with service = s

Replicate the centralized configuration file to every gateway interface for each gateway interface for each rule in the configuration file if the source is in the adjacent zone set direction to OUT else if the destination is in the adjacent zone set direciton to IN else set direction to BOTH

FIG. 8

METHOD AND APPARATUS FOR MANAGING A FIREWALL

CROSS REFERENCE TO RELATED APPLICATION

The application is a continuation of U.S. patent application Ser. No. 09/240,934, filed Jan. 29, 1999 now abandoned.

FIELD OF THE INVENTION

The present invention relates generally to firewalls, and more particularly, to a method and apparatus for managing a firewall.

BACKGROUND OF THE INVENTION

Network firewalls provide important safeguards for any network connected to the Internet. Firewalls are not simple applications that can be activated "out of the box." A firewall must be configured and managed to realize an important security policy for the particular needs of a given company or entity. It has been said that the most important factor affecting the security of a firewall is the firewall configuration. While firewalls have seen impressive technical advances, there have been few, if any, advances in firewall configuration and management.

A firewall is a network gateway that filters packets and separates a proprietary corporate network, such as an Intranet, from a public network, such as the Internet. Most of today's firewalls are configured by means of a rule-base or firewall configuration file. In the case of a firewall guarding a single, homogeneous Intranet, such as the local area network (LAN) of a small company, a single rule-base instructs the firewall which inbound sessions (packets) to permit to pass, and which should be blocked. Similarly, the rule-base specifies which outbound sessions (packets) are permitted. The firewall administrator needs to implement the high-level corporate security policy using this low-level rule-base.

The firewall's configuration interface typically allows the security administrator to define various host-groups (ranges of IP addresses) and service-groups (groups of protocols and corresponding port-numbers at the hosts that form the end-points). A single rule typically includes a source, a destination, a service-group and an appropriate action. The source and destination are host-groups, and the action is generally either an indication to "pass" or "drop" the packets of the corresponding session.

In many firewalls, the rule-base is order sensitive. In other words, the firewall checks if the first rule in the rule-base applies to a new session. If the first rule applies, the packets are either passed or dropped according to the action specified by the first rule. Otherwise, the firewall checks if the second rule applies, and so forth until a rule applies. This scheme often leads to misconfiguration due to redundant rules in the rule-base, and the desired security policy is realized only after re-ordering some of the rules.

Another possible configuration error is to set up the rules so that the firewall gateway is completely unreachable, and it becomes impossible to download new rule-bases. In any event, the security of the whole Intranet depends on the exact content of the rule-base, with no higher level of abstraction available. In addition, the syntax and semantics of the rules and their ordering depend on the particular make and model of the firewall.

The problems of administering a firewall are even worse for a larger company, which may use more than a single firewall. Multiple firewalls divide a company's Intranets into multiple zones, and the security policy is typically realized by multiple rule-bases, located on multiple gateways that connect the different zones to each other. Thus, the interplay between the various rule-bases must be carefully examined so as not to introduce security holes. The complexity of designing and managing the rule-bases grows, as the Intranets get more complex.

As apparent from the above-described deficiencies with conventional techniques for administering a firewall, a need exists for a method and apparatus for managing a firewall that facilitates the generation of a security policy and automatically generates the rule-bases from the security policy simultaneously for one or more gateways.

SUMMARY OF THE INVENTION

Generally, a method and apparatus are disclosed for managing a firewall. The disclosed firewall manager facilitates the generation of a security policy for a particular network environment, and automatically generates the firewall-specific configuration files from the security policy simultaneously for multiple gateways. According to one aspect of the invention, the security policy is separated from the specific rule syntax and semantics of the firewall manufacturer. Thus, the security administrator can focus on designing an appropriate policy without worrying about firewall rule complexity, rule ordering, and other low-level configuration issues.

According to another aspect of the invention, the security policy is separated from the actual network topology. Thus, the administrator can maintain a consistent policy in the presence of Intranet topology changes. Furthermore, this modularization allows the administrator to reuse the same policy at multiple corporate sites with different network details, or to allow smaller companies to use default or exemplary security policies designed by experts.

The firewall manager utilizes a model definition language and an associated parser to produce an entity relationship model. A model compiler translates the entity-relationship model into the appropriate firewall configuration files. The entity-relationship model provides a framework for representing both the firewall-independent security policy, and the network topology. The security policy is expressed in terms of "roles," which are used to define network capabilities of sending and receiving services. Roles capture the topology-independent and firewall-independent essence of a policy. A role is a property that may be assumed by different hosts in the network. A group of roles may be collectively assigned as role-groups. Host-groups or individual hosts are the entities to which role-groups are attached (via the attribute assumed-roles) and thus this is the place where the security policy (modeled by roles and role-groups) is linked to the network topology.

The model definition language (MDL) is used as an interface to define an instance of the entity-relationship model. The parser for the MDL generates such instances of the entity-relationship model. The model compiler translates a model instance into firewall-specific configuration files. A visualization and debugging tool is provided to transform the firewall-specific configuration files into a graphical representation of the current policy on the actual topology, allowing the viability of a chosen policy to be evaluated.

According to a further aspect of the present invention, a role-group may be closed so that inheritance of roles does not apply. A host, h, which assumes a closed role-group does not inherit other roles assigned to any other host-group, A, which contains h. A host may assume at most one closed role-group. Role-groups that are not closed, are called open.

A more complete understanding of the present invention, as well as further features and advantages of the present invention, will be obtained by reference to the following detailed description and drawings.

BRIEF DESCRIPTION OF THE DRAWINGS

FIG. 7 describes an exemplary routine for generating the list of positive rules performed by the rule-generation algorithm of FIGS. 6A and 6B;

FIG. 8 describes an exemplary routine performed by the configuration file topology adapter for setting the direction field of the rules produced by the rule-generation algorithm.

DETAILED DESCRIPTION

Figure 1:
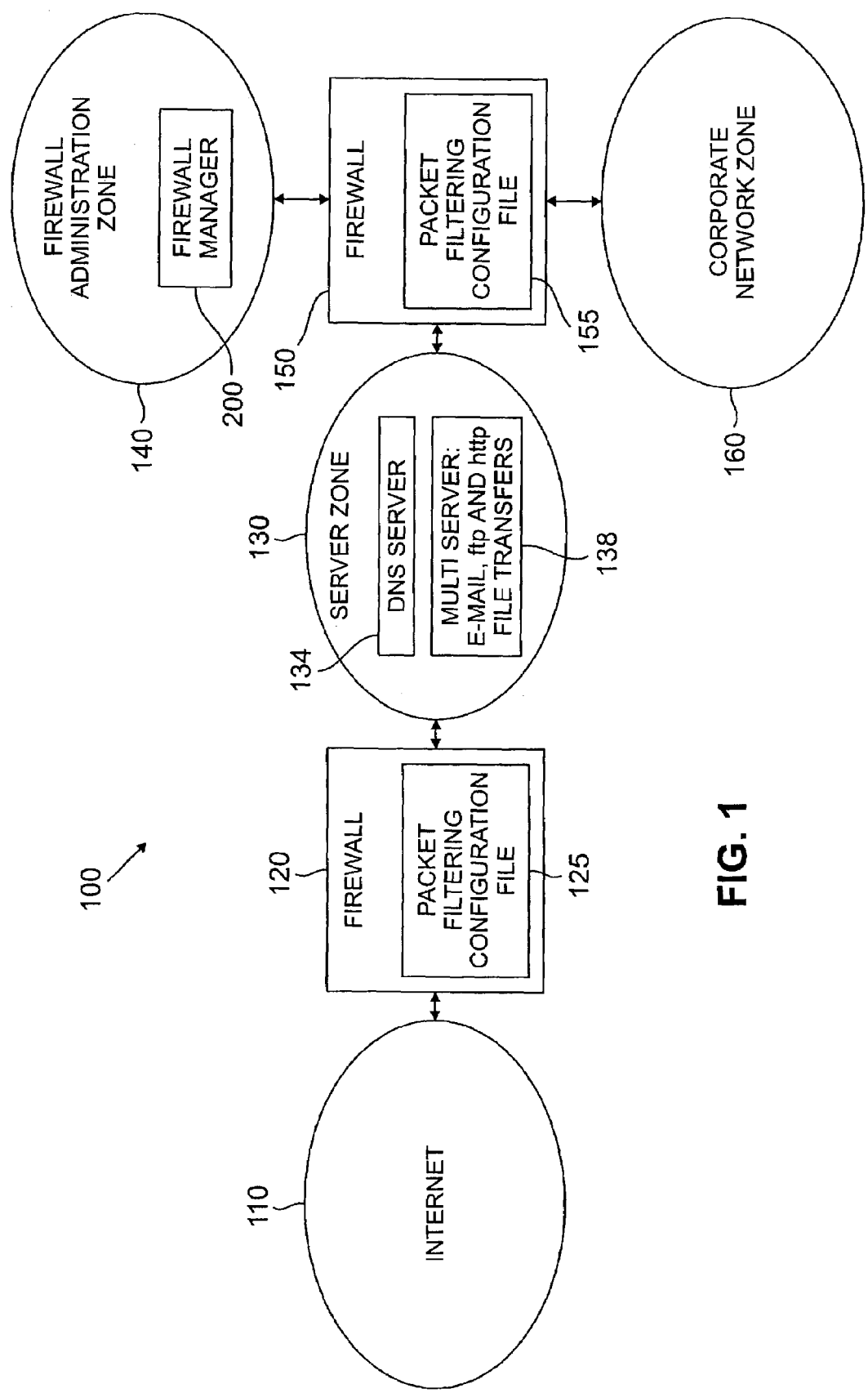
FIG. 1 illustrates a representative network environment in accordance with the present invention.

FIG. 1 illustrates a representative network environment 100 in accordance with the present invention. As shown in FIG. 1, the network 100 includes two firewalls 120, 150. The external firewall 120 guards the corporation's connection to an external network, such as the Internet 110. Behind the external firewall 120 is the server zone 130, often referred to as the "demilitarized zone" (DMZ), containing the corporation's externally visible servers. In the illustrative embodiment, the visible servers in the server zone 130 include a multiple server 138 that includes email (smtp), hyper-text transfer protocol (http) file transfers (web), and file transfer protocol (ftp) file transfer services, and a domain name server (dns) service 134.

Behind the server zone 130 is an internal firewall 150 that guards the corporation's proprietary or internal network, such as an Intranet. The internal firewall 150 has three interfaces. A first interface is to the server zone 130, a second interface connects the internal firewall 150 to the corporate network zone 160, and a third interface connects the internal firewall 150 to the firewall administration zone 140. Securing the firewall administration host is critical to the network's integrity and should be separated from the other corporate hosts. Within the corporate network zone there is generally one distinguished host, referred to as the control host (not shown), that provides the administration for the servers in the server zone 130. In the illustrative embodiment, each firewall 120, 150 has a packet filtering configuration file 125, 155, discussed below, associated with it. Generally, the packet filtering configuration files 125, 155 are firewall-specific rule-bases.

As discussed further below in conjunction with FIG. 2, the firewall administration zone 140 includes a firewall manager 200 in accordance with the present invention that allows a security policy to be generated for the representative network environment 100 of FIG. 1, and automatically generates the firewall-specific configuration files from the security policy simultaneously for multiple gateways.

According to one feature of the invention, the security policy is separated from the specific rule syntax and semantics of the firewall manufacturer or vendor. Thus, the present invention allows the security administrator to focus on designing an appropriate policy without worrying about firewall rule complexity, rule ordering, and other low-level configuration issues. In addition, separating the security policy from the vendor-specific rule syntax and semantics enables the unified management of network components from different vendors and a much easier transition when a company switches vendors.

According to another feature of the invention, the security policy is separated from the actual network topology. Thus, the present invention allows the administrator to maintain a consistent policy in the face of Intranet topology changes. Furthermore, this modularization allows the administrator to reuse the same policy at multiple corporate sites with different network details, or to allow smaller companies to use default or exemplary security policies designed by experts.

The present invention utilizes computer-implemented methods to generate the firewall configuration files automatically from the security policy simultaneously for multiple gateways. Thus, the probability of security holes introduced by hard-to-detect errors in firewall-specific configuration files is reduced. In addition, the present invention allows high level debugging of configuration files, allowing a security administrator to capture and reason about the information in the configuration files.

Figure 2:
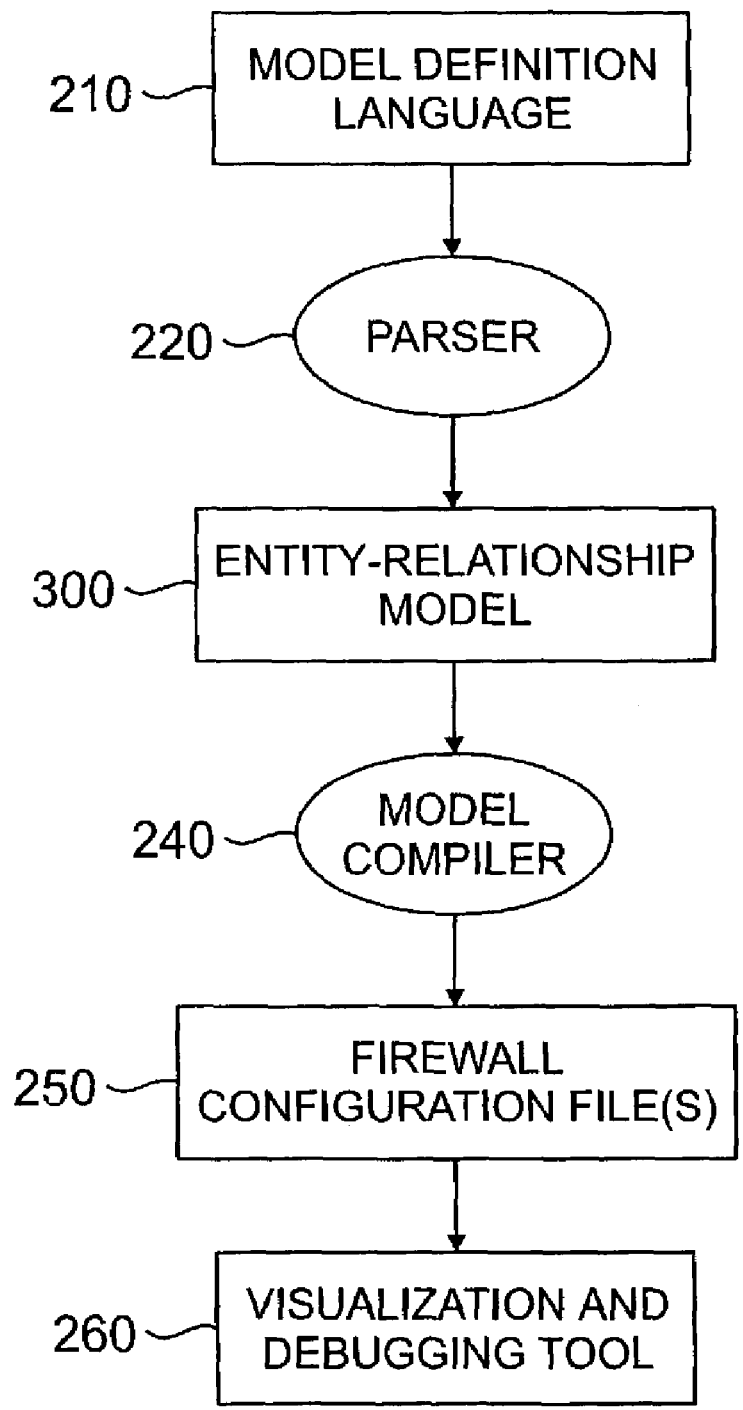
FIG. 2 illustrates the components of the firewall manager of FIG. 1.
Figure 3:
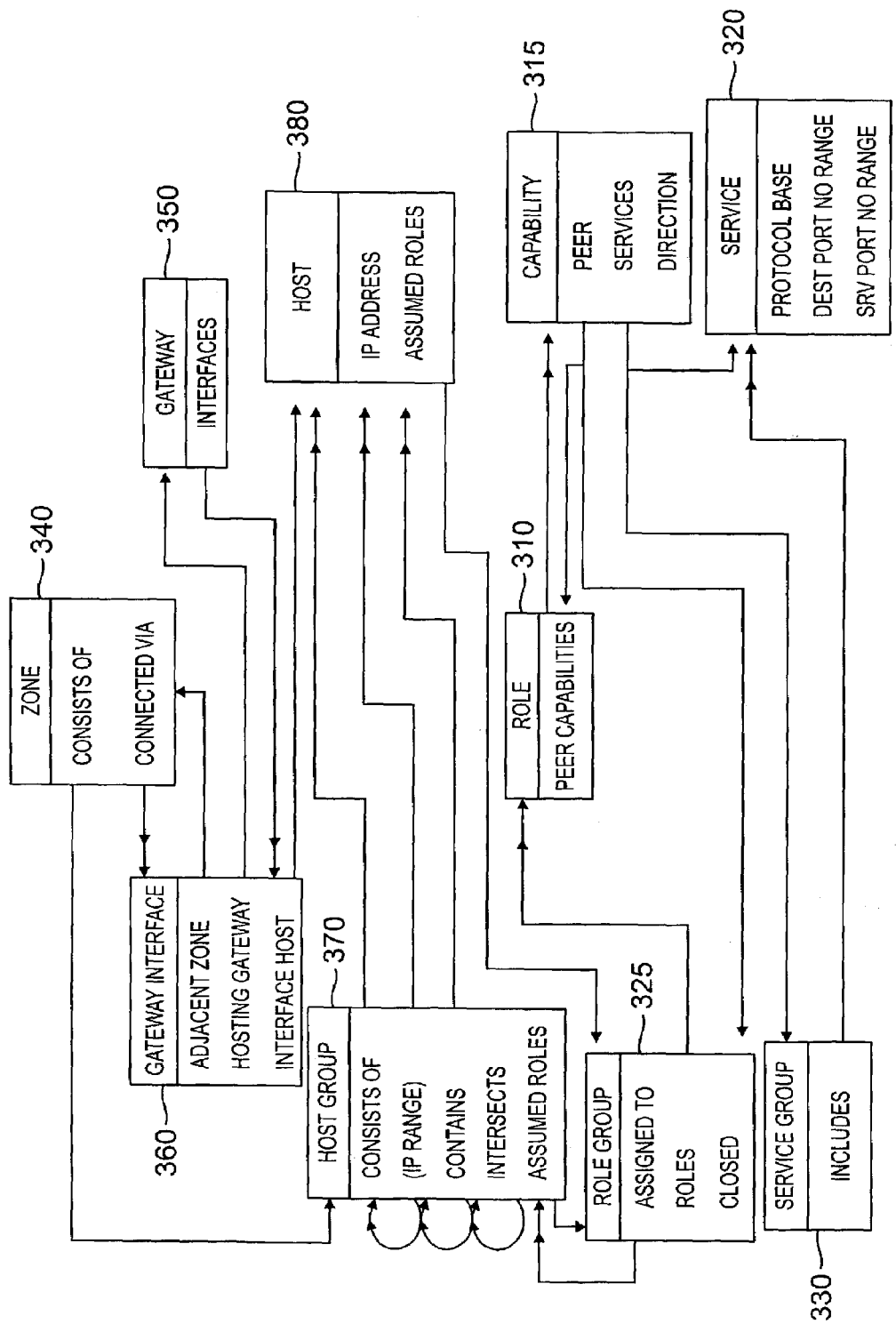
FIG. 3 illustrates the entity-relationship model framework of FIG. 2.

FIG. 2 illustrates the various components of a firewall manager 200, in accordance with the present invention. An entity-relationship model 300, discussed further below in conjunction with FIG. 3, provides a framework for representing both the firewall-independent security policy, and the network topology. As discussed further below, the security policy is expressed in terms of "roles," which are used to define network capabilities. Roles capture the topology-independent and firewall-independent essence of a policy.

A model definition language (MDL) 210 is used as an interface to define an instance of the entity-relationship model 300. A parser 220 for the MDL is disclosed that generates such instances of the entity-relationship model 300.

A model compiler 240 translates a model instance into one or more firewall configuration files 250. A set of such firewall configuration files 250 typically includes topology and rule-based information. Most modern firewalls allow the filtering capabilities to be distributed onto several gateways, in which case the compiler 240 has to generate a separate set of local configuration files for each gateway.

A visualization and debugging tool 260 transforms the firewall-specific configuration files into a graphical representation of the current policy on the actual topology. Such a visualization allows the viability of a chosen policy to be evaluated.

Firewall Terminology and Modeling Concepts

As used herein, gateways are the packet filtering machines, that can be either firewalls or routers. By definition, a gateway is multi-homed, since a gateway has at least two Internet connections. Each connection goes through an interface, which has its own unique IP address. It is assumed that each interface has a packet filtering configuration file associated with it. The gateways partition the IP address space into disjoint zones, as shown in FIG. 1. Most zones correspond to a company's subnet(s), usually with one big "Internet" zone 110 corresponding to the portion of the IP address space that is not used by the corporation. A service is the combination of a protocol-base, such as tcp or udp, and the port numbers on both the source and destination sides. For example, the service telnet is defined as tcp with destination port 23 and any source port.

As discussed below in conjunction with FIG. 3, a role is a property that may be assumed by different hosts in the network. Roles define capabilities of sending and receiving services. For example, the role of a "mail-server," might define the capability of receiving mail service from anywhere. A slightly more sophisticated policy might introduce the roles "mail-server" and "internal-mail-server." The role of the internal mail server defines the capability of receiving smtp email from peers assuming the role of a mail server. While mail servers with a robust "sendmail" module assume the role of mail-server, regular mail servers (inside the Intranet) assume the role of internal-mail-server. Roles are used to specify sending capabilities, as well as receiving capabilities. An outbound role, such as web-enabled, allows hypertext transfer protocol (http) communications to the outside world. Such a role is typically attached to an Intranet host, allowing employees to browse the web.

A role defines essentially (i) the allowed service(s); and (ii) the peers to or from which the services apply. The peers are expressed in terms of other (or the same) roles. Eventually, roles are assigned to actual hosts (machines), thus binding the policy (roles) to the actual topology. For convenience, role-groups (a collection of roles) are defined and assigned to hosts. Roles denote positive capabilities, and implicitly realize a "whatever is not explicitly allowed is disallowed" strategy. For example, a host accepts an http-request if and only if the host was assigned a corresponding role of web-server.

As discussed below in conjunction with FIG. 3, the network topology can also be modeled by an entity-relationship model 300. A host entity models a machine on the network with its own IP address and name. A host-group represents a set of machines, either defined by means of an IP address range or a set of other hosts or host-groups. Roles can be attached to both host and host-group entities. Inheritance is used in the natural way, such that the set of roles assumed by a host, h, is the set of all roles assigned to some host-group that includes h.

In the case of a gateway connecting a subnet for payroll with the rest of the Intranet, it is important to ensure that access to the gateway is limited to a few administrative tasks from a small set of other machines, otherwise routing and access control could be easily corrupted. In other words, the gateway should be "stealthed." While it is easy to assign roles to the gateway which only allow very limited capabilities, such as remote administration from hosts with a firewall-admin role, the gateway might inherit other roles, allowing undesirable access.

Thus, according to a further feature of the present invention, a closed group of roles is introduced. A closed role-group is a role-group for which inheritance of roles does not apply. A host, h, which assumes a closed role-group does not inherit other roles assigned to any other host-group, A, which contains h. A host may assume at most one closed role-group. Role-groups that are not closed, are called open. By default, role-groups are open. It is again noted that roles express positive capabilities. Thus, the "closed" role mechanism offers a limited form of negative expressiveness

Entity-Relationship Model

FIG. 3 illustrates the entity-relationship model framework. It is noted that an arrow having a single arrowhead in FIG. 3 represents a one-to-one relationship, while an arrow having a double arrowhead represents a one-to-many relationship. FIG. 3 represents the hierarchy of the object-oriented entity-relationship model framework. In accordance with the present invention, the entity-relationship model 300 provides an object-oriented framework for representing the firewall-independent security policy and the network topology. The security policy is expressed in terms of "role" objects that define one or more network capabilities 315. Each machine in the network is modeled as a "host" object 380. Generally, if a host object 380 or a host group object 370 (a defined collection of host objects) assumes a given role object 310 or role group object 325 (a defined collection of roles), the host object 380 or host group object 370 inherits the network capabilities that have been defined for the role object 310 or role group object 325

The network topology is modeled by partitioning the network into zone objects 340, that are connected via gateway objects 350. Each zone object 340 consists of one or more host objects 380. A gateway 350 consists of a gateway-interface object 360 for each adjacent zone 340. A packet leaving and entering a zone 340 can be filtered by the gateway 350 on the corresponding gateway-interface 360. Eventually, role objects are assigned to actual host objects (machines), thus binding the policy (roles) to the actual network topology.

As shown in FIG. 3, a role entity 310 consists of one or more peer-capabilities 315. Each such capability 315 defines, by means of its attributes, the allowed services 320, the peers, and the direction in which the service 320 can be executed. In other words, the direction of the service indicates whether the service 320 is executed from the role 310 to the peer for an outgoing capability 315, or from the peer to the role 310 for an incoming capability 315. The service entity 320 has a protocol-base and two port number attributes, dest-port-no-range and src-port-no-range. A peer points to another (or the same) role 310.

A role-group entity 325 consists of a set of roles 210. The role-group entity 325 also has a boolean attribute referred to as closed, discussed further below, that indicates whether or not the role-group 325 is a closed role-group. It is again noted that hosts that are assigned a closed role-group do not inherit other roles.

The network topology is modeled as follows. The network is partitioned into zones 340, connected via gateways 350. A gateway 350 consists of a gateway-interface 360 for each adjacent zone 340. Each gateway-interface 360 has its own IP address (modeled by the interface-host attribute). A packet leaving and entering a zone 340 can be filtered by the gateway 350 on the corresponding gateway-interface 360. Packets sent and received within the same zone 340, however, cannot be filtered by the gateway 350, because they do not pass through any gateway 350. Zones 340 consist of host-groups 370 that are typically further subdivided into a hierarchy of smaller host-groups 370 or single hosts 380. Each host-group 370 stores its containment and intersection relationship to other host-groups 370 in its "contains" and "intersects" attributes.

Host-groups 370 and hosts 380 are the entities to which role-groups 325 are attached (via the attribute assumed-roles) and thus this is the place where the security policy (modeled by roles 310 and role-groups 325) is linked to the network topology.

Model Definition Language (MDL)

A model definition language (MDL) 210 is used to instantiate the security policy, and to map the policy onto the topology. A parser 220 translates an MDL program 210 into an instance of the entity-relationship model 300. The model 300 is expressed by a corresponding data structure.

MDL for Security Policy Description

A service 320 is defined by means of a statement in the form:
<service-name>=
<protocol-base>[<dest-port-no-range>, <src-port-no-range>].

For example, the following code fragment defines the widely used services smtp, ssh, ping, https and a service denoting all tcp-based packets:

```
SERVICES {
    smtp =      TCP [25]
    ssh =       TCP [22]
    ping =      ICMP [8,0]
    https =     TCP [443]
    all_tcp =   TCP [*]
}
```

Services can be grouped into a service-group 330, ServiceGrp, by a statement of the following form:
<srv-grp-name>={<service-name1>, <service-name2> . . . }

The following code fragment defines the two service-groups, admin-to-gtwy and gtwy-to-admin:

```
SERVICE_GROUPS {
    admin-to-gtwy={ssh, ping}
    gtwy-to-admin={ssh, https}
}
```

A role 310 is defined by a statement of the following form, where the arrow defines the direction attribute in an obvious way, the role-grp-name points to peers, and the srv-grp-name points to a service-group 330:
<role-name>arrow<role(-grp)-name>: <srv-grp-name>
arrow==←∥→∥⇆

The following code fragment defines the roles mail_server and internal_mail_server, discussed above. The roles gateway-in and gateway-out model the capabilities of gateway interfaces in each direction. This example is continued in the next code fragment:

```
ROLE_DEFINITIONS {
    mail_server ←→ *: smtp
    internal_mail_server ←→ * mail_server : smtp
    gateway_in ← fw_admin : admin_to_gtwy
```

-continued

```
    gateway_out → fw_admin : gtwy_to_admin
    intranet_machine → all_tcp: *
}
```

Roles 310 are grouped into open (by default) role-groups 325 by the following statement:
<role-grp-name>={<role-name1>, <role-name2> . . . }

Roles 310 are grouped into closed role-groups 325 by the following statement:
<role-grp-name>=<<<role-name1>, <role-name2> . . . >>

The following code fragment defines the role-group, gateway, bundling the unidirectional gateway roles 310 into one role-group 325. It is noted that the gateway role-group is closed, thus effectively "stealthing" hosts which assume this role-group.

```
ROLE_GROUPS {
    gateway =   <<gateway_in, gateway_out>> # a closed group
```

MDL for Topology Description and Policy Mapping

Hosts 380 and host-groups 370 are defined by the following statements:
<host-name> = [ <IP-Addr>] : <role-grp-name>
<host-grp-name> = [ <IP-Range>] : <role-grp-name>

The following code fragment defines the hosts, dirty (presumably outside the intranet) and dusty, assigning them roles of external and internal mail servers, respectively:

```
HOST {
    dirty   =   [ 111.222.100.6]   : mail_server
    dusty   =   [ 111.222.1.3] :    internal_mail_server
}
```

Gateways 350 are defined by the following statement:
<gateway-name>={<host-name1>, <host-name2> . . . }

The following code fragment defines payroll_gw_interface1/2 as hosts and specifies their IP-addresses, and then defines the gateway payroll_gw as having payroll_gw_interface1/2 as its two interfaces. The code fragment also assigns the role-group, gateway, to the interfaces.

```
HOST {
    payroll_gw_interface1 = [111.222.26.226 ]: gateway
    payroll_gw_interface2 = [111.222.24.210 ]: gateway
}
GATEWAYS {
    payroll_gw = {payroll_gw_interface1, payroll_gw_interface2}
}
```

Zones 340 are defined by means of the following statement:
<zone-name>: {<gtwy-interface-name1>, <gtwy-interface-name2> . . . }

The following code fragment first defines the zones payroll_zone and corp_zone (parts of the intranet manhattan_office) as host-groups, specifies their IP-ranges and then defines parts of the network topology by specifying the payroll_zone to be connected to the payroll_gw by means of the payroll_gw_interface1, and the second interface of the payroll_gw to be connected to the corp_zone.

```
HOST-GROUPS {
manhattan_office  = [111.222.0.0-111.222.255.255]   : intranet_machine
payroll_zone      = [111.222.26.0-111.222.26.255]   : payroll_machine
corp_zone         = [111.222.24.0-111.222.24.255]   : non_payroll_machine
}
ZONES {
payroll_zone      = {payroll_gw_interface1}
corp_zone         = {payroll_gw_interface2, . . . }
}
```

The Model Compiler

After the security policy has been designed by the security administrator and programmed in the model definition language (MDL) 210, and the MDL parser 220 has generated the entity-relationship model 300, the entity-relationship model 300 needs to be translated into the appropriate firewall configuration files 250 by the model compiler 240. The translation guarantees that the resulting files correctly implement the underlying security policy. Since the configuration files 250 typically include service definitions, host-group definitions and configuration files for each gateway interface, the back-end of the compiler 240 needs to be vendor-specific.

The configuration files 250 for the services and host-groups are generated in a straight-forward manner, as would be apparent to a person of ordinary skill in the art. The generic firewall disclosed herein uses an ordered list and disallows whatever is not explicitly allowed. The generic rule format has the following fields: source host-group, destination host-group, service/service-group, action (such as pass/drop) and direction. It is noted that the direction field is different from the direction attribute of the role entity 310, discussed above. When packets are filtered, the rules in the list are examined according to their order until a match occurs, and then the corresponding action is performed. The final rule in the list is a default rule that drops every packet.

Figure 4:
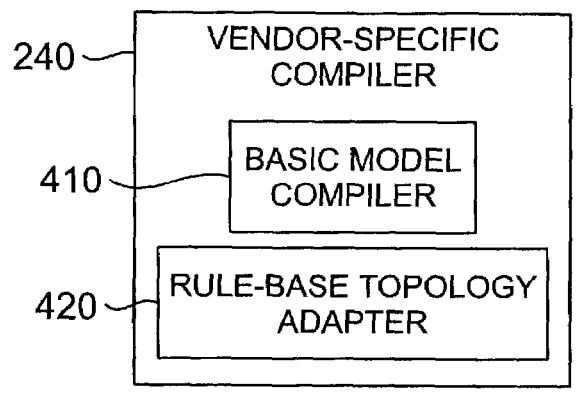
FIG. 4 is a schematic block diagram of the vendor-specific compiler of FIG. 2.
Figure 5:
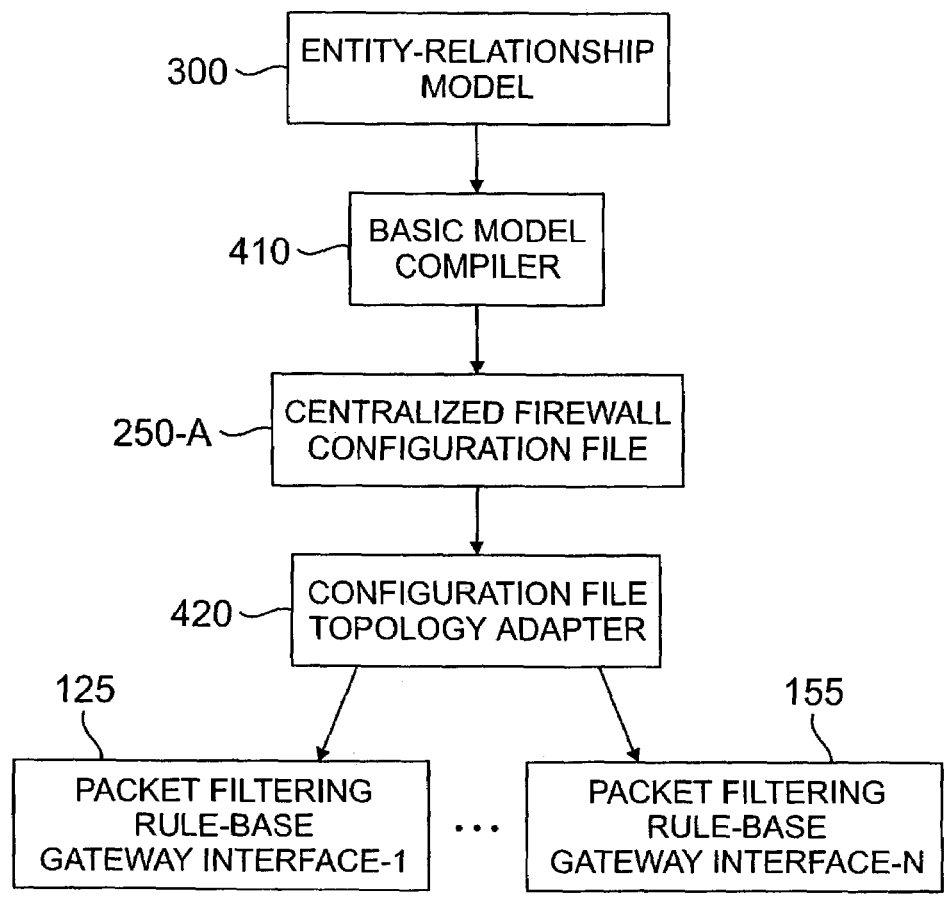
FIG. 5 is a flow chart illustrating the generation of a configuration file for each gateway interface as performed by the vendor-specific compiler of FIG. 4.

In one implementation, the generation of the firewall configuration files 250 can be separated into two parts. As shown in FIGS. 4 and 5, the model compiler 240 includes a basic model compiler 410 for creating a centralized firewall configuration file 250-A. In addition, the model compiler 240 includes a configuration file topology adapter 420 for producing packet filtering configuration files 125, 155 that are adapted to each of the gateway interfaces 120, 150, respectively.

The basic model compiler 410 translates an instance of the entity-relationship model 300 into a firewall configuration file 250-A. The basic model compiler 410 ignores the network structure, such as the location of gateways, and focuses on the definitions of roles 310, role-groups 325, and their assignments to host-groups 370. The basic model compiler 410 uses the definitions of roles 310 and role-groups 325 to deduce which pairs of host-groups 370 should have a firewall rule that allows a certain service between them, ignoring the question of which gateway 120, 150 can actually enforce this rule. The output of the basic model compiler 410 is therefore a single, centralized firewall configuration file 250-A, which contains all of the required rules to implement the policy. The centralized firewall configuration file 250-A does not set the rule's direction field. As previously indicated, the direction field of each rule is achieved in a subsequent stage by the configuration file topology adapter 420.

Role definitions are a description of what operations are allowed between machines according to their assumed roles. It follows that the role-group assignment to a particular host-group, H, corresponds to a set of positive rules between H and other hosts, assuming peer roles. The set of rules is said to be associated with H. If all the role-groups are open then these positive rules are non-conflicting and hence form a correct configuration file.

The treatment of closed role-groups is more involved. Consider a host, h, which assumes a closed role-group, C. Let H be a host-group that contains h, and assumes a different role-group, R. The fact that h is assigned a closed role-group implies that h should not inherit any roles from host-group, H. However, if the set of positive rules associated with H (as implied by R) are generated, then some services would be incorrectly allowed for h.

This problem may be avoided by having the basic model compiler 410 split host-groups such that no resulting host-group includes hosts assuming closed role-groups. For example, the basic model compiler 410 would replace H by H', with H' having the same group of hosts, other than h, and H' would assume the role-group, R. Then the basic model compiler 410 would generate the set of positive rules that are associated with H' (instead of H). Thus, only positive rules are created. This solution is considered suboptimal, however, since the creation of non user-defined host-groups may increase the difficult of the debugging process.

Rather, negative rules are used to avoid the need for new host-groups. Intuitively, positive rules dealing with closed role-groups must appear before other rules in the configuration file, and these positive rules are followed by negative rules which capture the notion of "nothing else is allowed for the host group." The rules that deal only with open role-groups appear only after all the closed role-groups have been processed. A host-group is referred to as closed if the host-group is assigned a closed role-group, and is referred to as open otherwise.

Figure 6A:
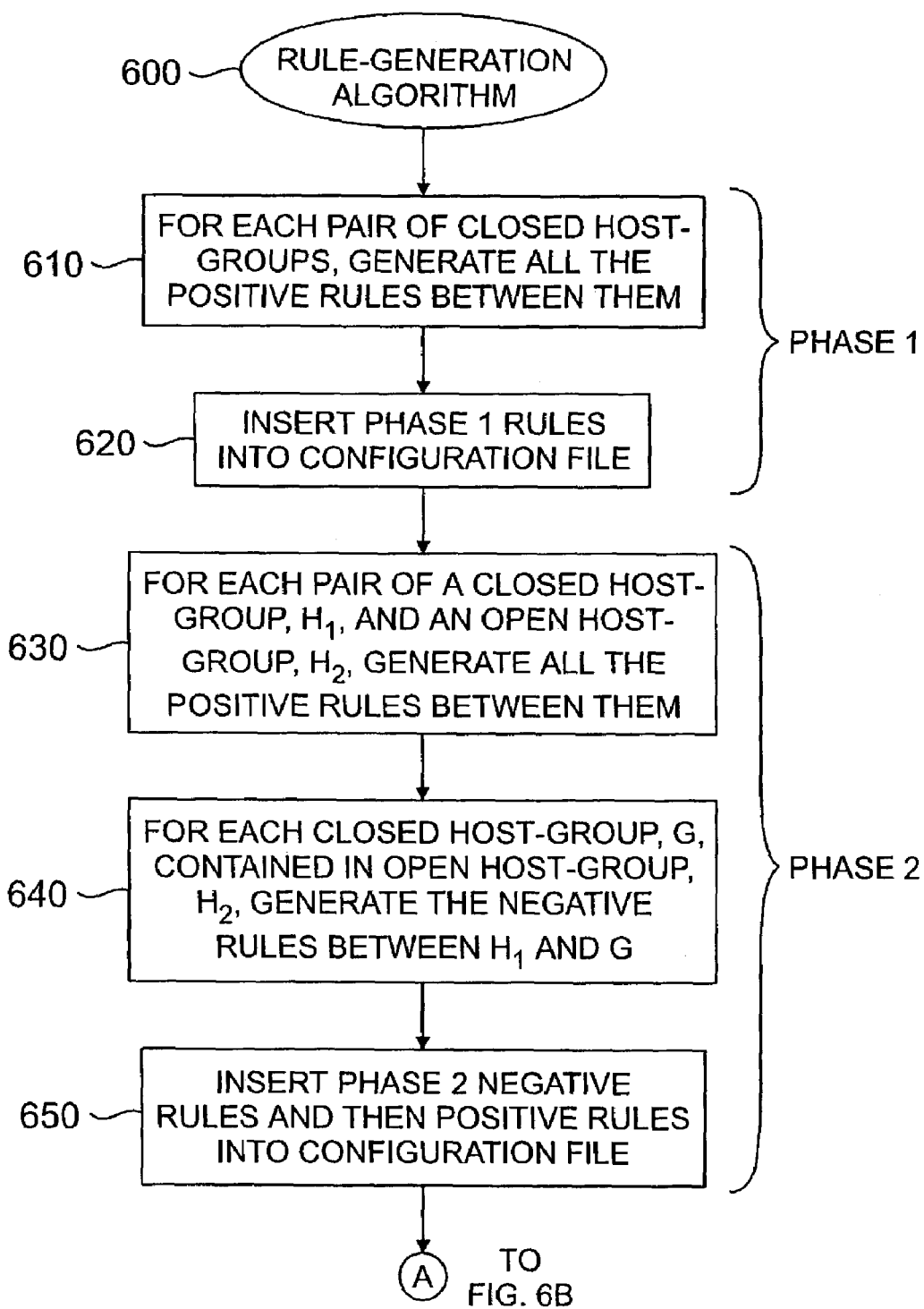
FIGS. 6A and 6B, collectively, are a flowchart describing an exemplary rule-generation algorithm performed by the basic model compiler of FIG. 4.

FIG. 6 illustrates an illustrative rule-generation algorithm 600 performed by the basic model compiler 410. As shown in FIG. 6, the rule-generation algorithm 600 is composed of three phases, at the end of which the default negative rule is added to the firewall configuration file 250.

Initially, for each pair of closed host-groups, all of the positive rules are generated between them during step 610. Thereafter, the generated positive rules are inserted into the centralized firewall configuration file 250-A during step 620.

Thereafter, during phase 2, for each pair of a closed host-group, $H_1$ and an open host-group, $H_2$, all of the positive rules are generated between them during step 630. For each closed host-group, G, contained in an open host-group, $H_2$, all of the negative rules are generated between $H_1$ and G during step 640. Thereafter, the phase 2 negative rules and then the phase 2 positive rules are inserted into the centralized firewall configuration file 250-A during step 650.

Figure 6B:
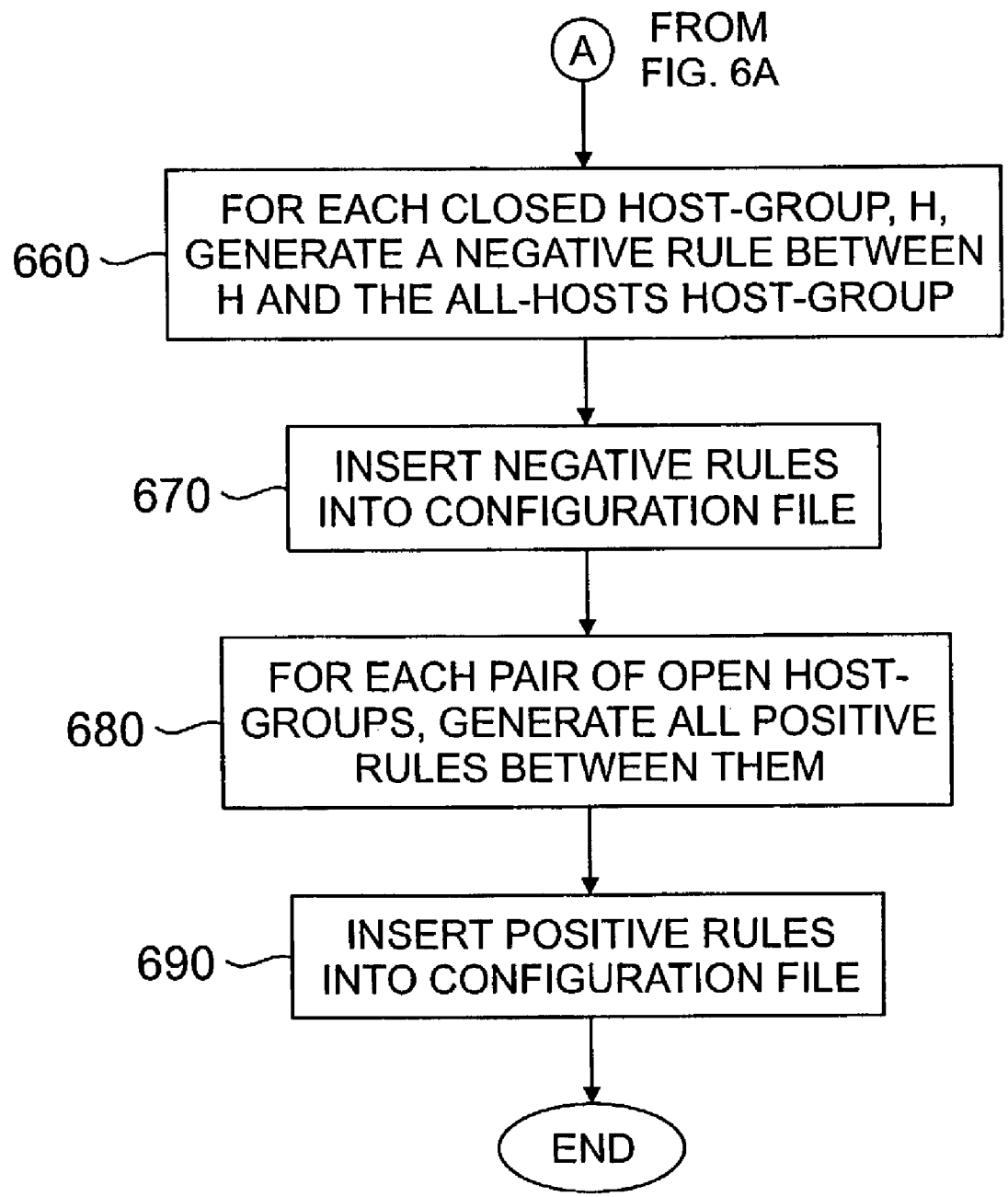

During phase 3, for each closed host-group, H, the negative rules are generated between H and the all-hosts host-group during step 660 (FIG. 6B). Thereafter, the generated negative rules are inserted into the centralized firewall configuration file 250-A during step 670. For each pair of open host-groups, all of the positive rules are generated between them during step 680. The positive rules are then inserted into the centralized firewall configuration file 250-A during step 690, before program control terminates.

As a basic component of the rule-generation algorithm 600, for a pair of host-groups, $H_1$ and $H_2$, the list of positive rules that are associated with $H_1$ and apply to $H_2$ must be generated. FIG. 7 illustrates a routine for generating the list of positive rules. As shown in FIG. 7, the positive rules may be generated by the following pseudo-code:

for each role r in the role-group assigned to $H_1$:
  for each statement in the form: {r $ R: s}
    if $H_2$ is closed: /* create a rule if $H_2$ has a role, r*/
      if the role-group assigned to $H_2$ contains a role in R, then
        create a positive rule between $H_1$ and $H_2$ with service=s
    otherwise, for all host-groups G that contain $H_2$:
      if the role-group assigned to G contains a role in R
        create positive rule between $H_1$ and $H_2$ with service=s where r is a role, $ indicates the direction, R is a role-group and s is a service.

Continuing the above example, where the open host-group, H, contains the closed host-group, h. Assume that there is another open host-group, H', also assuming role-group, R, and that R allows hosts to send to other hosts with the same role-group (in other words, there exists an MDL statement of the form "R→R: s1"). Further assume that role-groups C and R do not have roles in common, and there are no definitions of the form "C→R: s2"). Only phase 3 of the rule-generation algorithm 600 applies. It first generates a negative rule for h, followed by positive rules for the pair H and H', thus achieving the desired semantics.

As previously indicated, the centralized firewall configuration file 250-A, generated by the basic model compiler 410 must be distributed to each of the gateways 120, 150 in the network 100 with appropriate customization for each interface 120, 150. To ensure that the security policy is observed, all rules that concern a certain pair of hosts in all gateways along any possible routing path between them must be included. In order to avoid making assumptions on the routing protocols and to add tolerance to routing failures, a "safe" strategy replicates the centralized firewall configuration file 250-A onto every gateway 120, 150.

As previously indicated, the configuration file topology adapter 420 sets the direction field of the rules. The way the direction field is used by the firewall is as follows. The firewall checks the direction in which the packet enters the gateway interface 120, 150 and compares the direction with the direction field of the rule. If the packet is attempting to leave the interface into the adjacent zone, the packet is allowed only if the rule's direction is IN or BOTH. Likewise, a packet is allowed to enter the interface from the adjacent zone only if the rule's direction is OUT or BOTH.

The direction field is not implied by the role's direction attribute, which is captured by the fact that one host-group is designated as the source while the other host-group is designated as the destination. In the absence of other information, the rule direction fields can be set to BOTH. However, the rule direction fields should be set as precisely as possible, since this allows the firewalls 120, 150 to ensure that packets which claim to arrive from a host h indeed appear only on the gateway interface that leads to h.

In a general network topology, if no assumptions are made on routing protocols, the source-destination paid does not imply much information about the direction of the packet, except if the source or destination reside in the adjacent zone to the gateway interface 120, 150. Thus, the configuration file topology adapter 420 implements the algorithm 800 shown in FIG. 8. As shown in FIG. 8, the centralized configuration file is initially replicated to every gateway interface. For each gateway interface, and for each rule in the configuration file, the algorithm 800 implements the following pseudo-code:

if the source is in the adjacent zone
  set direction to OUT
else if the destination is in the adjacent zone
  set direction to IN
else set direction to BOTH.

It is noted that to avoid unnecessary replication and to prevent spoofing, some knowledge about routing assurances must be available. This knowledge can be placed in a rule optimizer or could be made part of an extension to the entity-relationship model 300.

Rule Illustrator

As previously indicated, a visualization and debugging tool 260 transforms the firewall configuration files 250 into a graphical representation that provides a visual representation of both the host-groups structure and the services (packets) that the firewall passes. The visualization and debugging tool 260 creates a visualization of the policy as it is seen from the point of view of a single gateway interface. The visualization and debugging tool 260 displays which host-groups are on which side of the interface 120, 150, and the firewall rules enforced by this interface.

The visualization and debugging tool 260 makes the task of debugging the firewall manager 200 easier. It is clearer to look at a colorful graph than to sift through long, automatically generated configuration files in an arcane firewall format. However, the visualization and debugging tool 260 is also useful in its own right. For example, since the visualization and debugging tool 260 reads the firewall configuration file 250, the visualization and debugging tool 260 can be used to reverse engineer existing configuration files in order to extract the security policy.

The visualization and debugging tool 260 visualizes the structure of the host-groups with respect to containment and intersection. This is important since a rule that applies to some host-group, A, is inherited by any host whose IP address falls with A.

The host-group structure is displayed as a graph whose nodes are labeled by the host-group name. In the illustrative embodiment shown in FIG. 9, a solid black edge between two nodes A and B, such as lines 910, 920, indicates that one node contains the other. The direction of containment (whether $A \subset B$ or $B \subset A$) is indicated by which node is above the other. A dashed black edge, such as lines 930, 940, indicates host-groups that intersect (in other words, host-groups that overlap but one does not completely contain the other).

Initially, the host-groups are partitioned into two categories 950, 960, depending on the side of the interface in which they reside. One category is called the "outside" zone 950, typically the one that contains the Internet zone 110, while the other category is called the "inside" zone 960.

The partitioned network is visualized by introducing two artificial host-groups 970, 980, called \_out and \_in, and displaying them as two diamond-shaped nodes 970, 980 in the middle of the graph 900 (other host-groups are shown as ovals). The inside host-groups 960 are displayed as a tree that grows downward from the \_in node 980. The outside host-groups 970 are displayed as a tree that grows upward from the \_out node 970. Thus, for inside host-groups 960, if A has an inclusion edge to B and A is above B (A is closer to the \_in node 980) then A ⊃ B. For outside host-groups 950, the group closer to the \_out node 970 includes the other. The trees 950, 960 represent the minimum inclusion relation whose transitive closure equals the host-groups inclusion relation. The layout of the trees 950, 960 is determined by the inclusion relation. The intersection edges, which do not obey the tree layering, are added later. Finally, colors are assigned to the nodes to represent the zones. All the host-groups belonging to the same zone get the same color. It is noted that if a host-group belongs to both the "outside" zone 950, and the "inside" zone 960 at the same time, the host-group can be artificially broken up into two in- and out-subgroups and each subgroup can be displayed separately.

Figure 9:
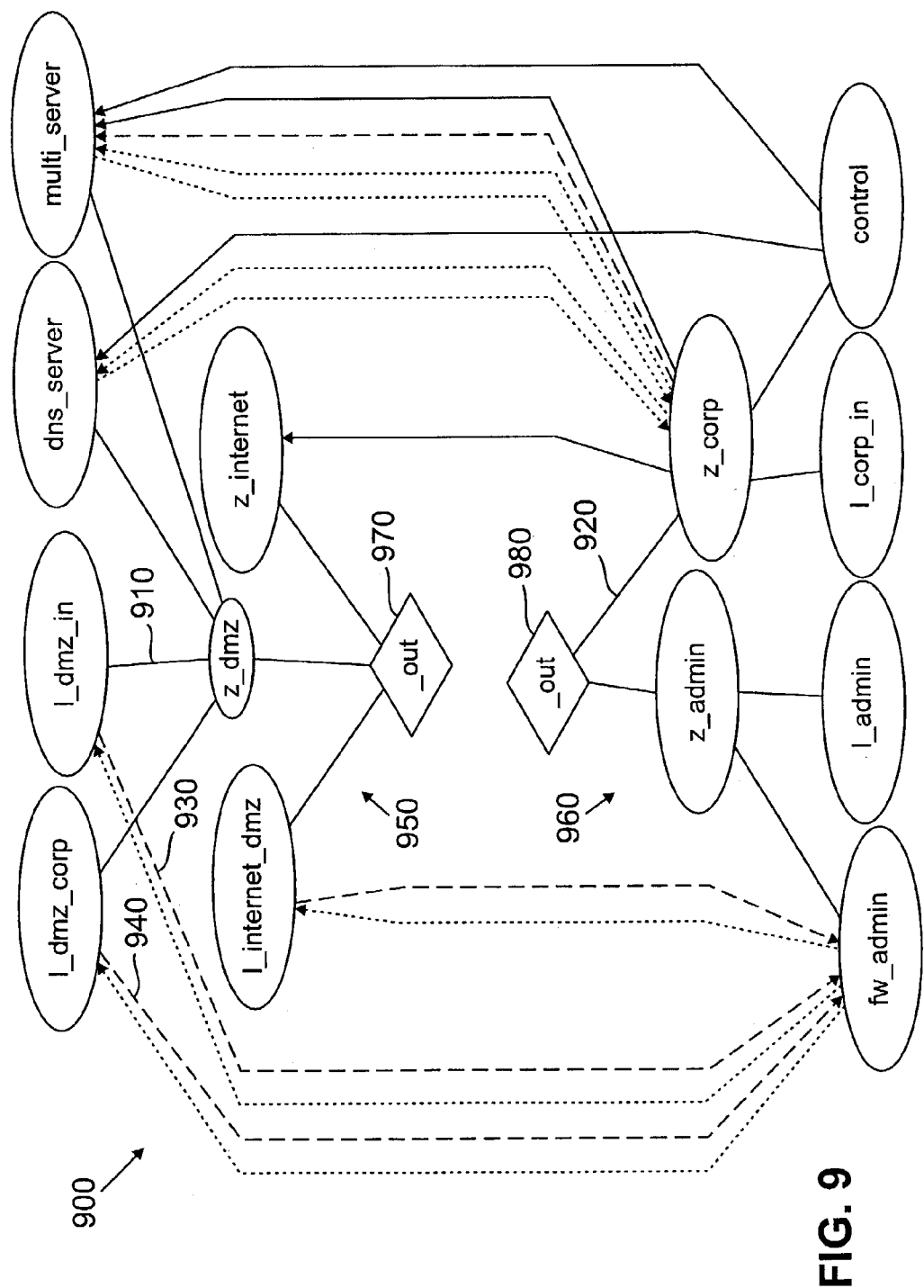
FIG. 9 illustrates a graphical representation visualizing the host-groups structure and the services (packets) that the firewall passes.

The visualization and debugging tool 260 displays the rules only for services that cross the interface. Rules dealing with services where both endpoints are on the same side of the interface are ignored. As shown in FIG. 9, the rules are represented by directed edges (arrows) from source to destination. An edge from A to B represents a service that the firewall allows to pass from host-group A (and its sub-groups) to host-group B (and its sub-groups). Different services are shown by color coding the edges. For example, all tcp services can be shown with red arrows, and all telnet services can be shown using blue arrows.

It is to be understood that the embodiments and variations shown and described herein are merely illustrative of the principles of this invention and that various modifications may be implemented by those skilled in the art without departing from the scope and spirit of the invention.

For example, the model framework can easily be extended to accommodate evolving firewalls. New attributes can be added to objects via inheritance, or whole new objects can be added without invalidating the original model.

We claim:

1. A method for generating a configuration file for at least one firewall in a network, said network including a plurality of hosts, said method comprising the steps of:
    receiving a definition for a plurality of roles that specify the ability of a host to send and receive packets, wherein each of said roles may be assigned to said hosts independently of a topology of said network, such that said hosts inherit said definitions associated with an assigned role;
    receiving an assignment of said roles to said hosts in said network; and
    generating rules for said hosts based on said assigned roles, said rules determining whether a packet is passed to a destination host.

2. The method of claim 1, wherein a configuration file is generated for a plurality of firewalls in said network.

3. The method of claim 1, wherein a security policy for said network is expressed in terms of said roles defining network capabilities of sending and receiving services.

4. The method of claim 1, wherein a plurality of said roles are combined into role-groups that may be assigned to one or more hosts.

5. The method of claim 1, wherein a plurality of said hosts are combined into a host-group that may be assigned a role or a role-group.

6. The method of claim 1, further comprising the step of providing a visual representation of the structure of said hosts in said network.

7. The method of claim 1, further comprising the step of providing a visual representation of a set of rules in said configuration file.

8. The method of claim 1, wherein said generating step is performed by a vendor-specific compiler that produces a vendor-specific firewall configuration file.

9. A method of generating a security policy for a network, said network including a plurality of hosts, said method comprising the steps of:
    receiving a definition for a plurality of roles that specify the ability of a host to send and receive packets, wherein each of said roles may be assigned to said hosts independently of a topology of said network, such that said hosts inherit said definitions associated with an assigned role;
    receiving an assignment of said roles to said hosts in said network; and
    generating said security policy from said received definitions and assignments.

10. The method of claim 9, further comprising the step of translating said security policy into at least one configuration file for a firewall on said network.

11. The method of claim 10, wherein said configuration files are generated for a plurality of firewalls in said network.

12. The method of claim 9, wherein a plurality of said roles are combined into a role-group that may be assigned to a host.

13. The method of claim 9, wherein a plurality of said hosts are combined into a host-group that may be assigned a role or role-groups.

14. The method of claim 9, further comprising the step of providing a visual representation of the structure of said hosts in said network.

15. A compiler for generating a configuration file for a firewall in a network, said network including a plurality of hosts, comprising:
    a memory for storing computer-readable code; and
    a processor operatively coupled to said memory, said processor configured to execute said computer-readable code, said computer-readable code configuring said processor to:
    receive a definition for a plurality of roles that specify the ability of a host to send and receive packets, wherein each of said roles may be assigned to said hosts independently of a topology of said network, such that said hosts inherit said definitions associated with an assigned role;
    receive an assignment of said roles to said hosts in said network; and
    generate rules for said hosts based on said assigned roles, said rules determining whether a packet is passed to a destination host.

16. A system for generating a security policy for a network, said network including a plurality of hosts, said system comprising:
    a memory for storing computer-readable code; and
    a processor operatively coupled to said memory, said processor configured to execute said computer-readable code, said computer-readable code configuring said processor to:

receive a definition for a plurality of roles that specify the ability of a host to send and receive packets, wherein each of said roles may be assigned to said hosts independently of a topology of said network, such that said hosts inherit said definitions associated with an assigned role;

receive an assignment of roles to said hosts in said network; and generate said security policy from said received definitions and assignments.

* * * * *

UNITED STATES PATENT AND TRADEMARK OFFICE
CERTIFICATE OF CORRECTION

PATENT NO. : 7,146,639 B2
APPLICATION NO. : 10/336874
DATED : December 5, 2006
INVENTOR(S) : Bartal et al.

It is certified that error appears in the above-identified patent and that said Letters Patent is hereby corrected as shown below:

On Title Page item 56 entitled "References Cited - U.S. Patent Documents" please insert the following reference:

-- 6,182,288   Boden et al --

Signed and Sealed this

Thirtieth Day of January, 2007

JON W. DUDAS
*Director of the United States Patent and Trademark Office*